US011106849B2

(12) United States Patent
Giordano

(10) Patent No.: US 11,106,849 B2
(45) Date of Patent: Aug. 31, 2021

(54) METHOD FOR GENERATING REDUNDANT CONFIGURATION IN FPGAS

(71) Applicant: UNIVERSITA' DEGLI STUDI DI NAPOLI FEDERICO II, Napoli (IT)

(72) Inventor: Raffaele Giordano, Pozzuoli (IT)

(73) Assignee: Universita' Degli Studi Di Napoli Federico II, Naples (IT)

( * ) Notice: Subject to any disclaimer, the term of this patent is extended or adjusted under 35 U.S.C. 154(b) by 258 days.

(21) Appl. No.: 16/348,810

(22) PCT Filed: Dec. 20, 2018

(86) PCT No.: PCT/IB2018/060461
§ 371 (c)(1),
(2) Date: May 9, 2019

(87) PCT Pub. No.: WO2019/138282
PCT Pub. Date: Jul. 18, 2019

(65) Prior Publication Data
US 2020/0265179 A1 Aug. 20, 2020

(30) Foreign Application Priority Data
Jan. 9, 2018 (IT) .................... 102018000000631

(51) Int. Cl.
G06F 30/30 (2020.01)
G06F 30/34 (2020.01)
(Continued)

(52) U.S. Cl.
CPC ....... G06F 30/34 (2020.01); G01R 31/31816 (2013.01); G06F 30/343 (2020.01);
(Continued)

(58) Field of Classification Search
CPC ...... G06F 30/337; G06F 30/34; G06F 30/343; G06F 30/347; G06F 2119/06; G01R 31/31816; H03K 19/177
See application file for complete search history.

(56) References Cited

U.S. PATENT DOCUMENTS 6,104,211 A 8/2000 Alfke
6,493,862 B1 12/2002 Young et al.
(Continued)

OTHER PUBLICATIONS

R. Giordano et al., "Redundant-Configuration Scrubbing of SRAM-Based FPGAs," IEEE Trans. on Nuclear Science, vol. 64, No. 9, Sep. 2017, pp. 2497-2504. (Year: 2017).*
(Continued)

Primary Examiner — Leigh M Garbowski
(74) Attorney, Agent, or Firm — Workman Nydegger

(57) ABSTRACT

A method for generating redundant configuration in FPGA devices includes: analysing the configuration pertaining to a given design to be configured, or already configured, in the FPGA device, in order to identify programmed and empty configuration memory portions, configuring the FPGA device for implementing said design, measuring the power consumption of the configured FPGA device, copying the configuration from at least some subsets of the programmed portion to subsets of the empty portion, (a) verifying the configuration read back from said subsets of the empty portion with the configuration data read from said subsets of the programmed portion, (b) verifying whether the functionality of the design after the copy is still correct, (c) measuring the power consumption of the FPGA device, and verifying whether the power consumption of the FPGA device after the copy is acceptable according to pre-defined criteria, if the verification steps (a), (b) and (c) are all successful the redundant configuration is correctly generated, and if the verification steps (a), (b) and (c) are not all (Continued)

successful the method restarts from the beginning choosing other subsets of the empty portion of the FPGA device for hosting the configuration data from said subsets of the programmed portion.

13 Claims, 7 Drawing Sheets

(51) Int. Cl.
   *H03K 19/177* (2020.01)
   *G06F 30/343* (2020.01)
   *G01R 31/3181* (2006.01)
   *G06F 30/337* (2020.01)
   *G06F 30/347* (2020.01)
   *G06F 119/06* (2020.01)

(52) U.S. Cl.
   CPC ......... *H03K 19/177* (2013.01); *G06F 30/337* (2020.01); *G06F 30/347* (2020.01); *G06F 2119/06* (2020.01)

(56) References Cited

U.S. PATENT DOCUMENTS

| | | | |
|---|---|---|---|
| 6,624,654 | B1 | 9/2003 | Trimberger |
| 7,236,000 | B1 | 6/2007 | Steiner |
| 7,298,168 | B1 | 11/2007 | Steiner |
| 7,343,579 | B2 * | 3/2008 | Coxe ............... G06F 15/7867 716/101 |
| 7,482,954 | B1 * | 1/2009 | Trimberger ......... H03M 7/3084 341/50 |
| 7,576,557 | B1 | 8/2009 | Tseng et al. |
| 8,332,722 | B1 * | 12/2012 | Vera Rojas ....... H03M 13/3776 714/758 |
| 10,229,016 | B2 * | 3/2019 | Freydel ............... G06F 11/182 |
| 2007/0260954 | A1 | 11/2007 | Wong |

OTHER PUBLICATIONS

International Preliminary Report on Patentability dated Jul. 14, 2020, issued in PCT Application No. PCT/IB2018/060461, filed Dec. 20, 2018.
International Search Report and Written Opinion dated May 7, 2019, issued in PCT Application No. PCT/IB2018/060461, filed Dec. 20, 2018.
Italian Search Report dated Oct. 5, 2018, issued in Italian Application No. 201800000631, filed Jan. 9, 2018.
Jahanzeb Anwer et al., *FPGA Redundancy Configurations: An Automated Design Space Exploration*, 2014 IEEE 28th International Parallel and Distributed Processing Symposium Workshops, May 19, 2014, XP032696269, pp. 275-280.
Jonathan Heiner et al., *Fault Tolerant ICAP Controller for High-Reliable Internal Scrubbing*, 2008 IEEE Aerospace Conference, Mar. 1-8, 2008, XP031256341, pp. 1-10.
Marco Lanuzza et al., *A Self-Hosting Configuration management System to Mitigate the Impact of Radiation-Induced Multi-Bit Upsets in SRAM-based FPGAs*, Industrial Electronics, Jul. 4, 2010, XP031803118, pp. 1989-1994.
*Virtex UltraScale FPGAs Data Sheet: DC and AC Switching Characteristics*, Xilinx Inc. DS893 (V1.7.1) Apr. 4, 2016, pp. 79.
*Intel® Stratix 10 Device Overview S10-OVERVIEW*, Altera Corp., Dec. 4, 2015, pp. 36.
M. Wirthlin, *High-Reliability FPGA-Based Systems: Space, High-Energy Physics, and Beyond*, in Proc. of the IEEE, vol. 103, No. 3, Mar. 2015, pp. 379-389.
H. Quinn, *Radiation effects in reconfigurable FPGAs*, Semicond. Sci. Technol., vol. 32, No. 4 (8 pp), Mar. 2017 (ABSTRACT).
*Radiation-Hardened, Space-Grade Virtex-5QV Family Overview*, Xilinx Inc. DS192 (v1.4) Nov. 12, 2014.
L. Sterpone et al., *Analysis of the Robustness of the TMR Architecture in SRAM-based FPGAs*, IEEE Trans. on Nucl. Sci., vol. 52, No. 5, Oct. 2005, pp. 1545-1549.
I. Herrera-Alzu et al., *Design Techniques for Xilinx® Virtex FPGA Configuration Memory Scrubbers*, IEEE Trans. Nucl. Sci., vol. 60, No. 1, Feb. 2013, pp. 376385.
A. Stoddard et al., *A Hybrid Approach to FPGA Configuration Scrubbing*, IEEE Trans. on Nucl. Sci., vol. 64, No. 1, Jan. 2017, pp. 497-503 (ABSTRACT).
M. Berg, et al., *Effectiveness of Internal Versus External SEU Scrubbing Mitigation Strategies in a Xilinx FPGA: Design, Test, and Analysis*, IEEE Trans. Nucl. Sci., vol. 55, No. 4, Aug. 2008, pp. 2259-2266, (ABSTRACT).
A. Manuzzato et al., *Effectiveness of TMR-Based Techniques to Mitigate Alpha-Induced SEU Accumulation in Commercial SRAM-Based FPGAs*, IEEE Trans. Nucl. Sci., vol. 55, No. 4, Aug. 2008, pp. 1968-1973.
P. S. Ostler et al., *SRAM FPGA Reliability Analysis for Harsh Radiation Environments*, IEEE Trans. Nucl. Sci., vol. 56, No. 6, Dec. 2009, pp. 3519-3526.
Xilinx Inc., *LogiCORE IP Soft Error Mitigation Controller*, v 4.0, Jun. 19, 2013, pp. 119.
J. Tonfat et al., *Analyzing the Effectiveness of a Frame-Level Redundancy Scrubbing Technique for SRAM-based FPGAs*, IEEE Trans. Nucl. Sci., vol. 62, No. 6, Dec. 2015, pp. 3080-3087.
Ignacio Herrera-Alzu et al., *Self-Reference Scrubber for TMR Systems Based on Xilinx Virtex FPGAs*, Lecture Notes Computer Science, vol. 6951, 2011, pp. 133-142.
C. Lavin et al., *RapidSmith: Do-it-yourself CAD Tools for Xilinx FPGAs*, in Proc. 2011 21st Int. Conf. F. Program. Log. Appl., Sep. 2011, pp. 349-355 (ABSTRACT).
R. Giordano et al., *Layout and Radiation Tolerance Issues in High-Speed Links*, IEEE Trans. Nucl. Sci. vol. 62, No. 6, Dec. 2015, pp. 3177-3185.
T. Haroldsen et al., *RAPIDSMITH 2: A Framework for BEL-level CAD Exploration on Xilinx FPGAs*, Feb. 2015, pp. 66-69.

\* cited by examiner

METHOD FOR GENERATING REDUNDANT CONFIGURATION IN FPGAS

BACKGROUND OF THE INVENTION

Field of the Invention

The present invention generally relates to Field Programmable Gate Arrays (FPGAs) and more particularly to techniques for generating redundant configuration within those FPGA devices. The redundant configuration can be exploited by properly-devised circuits for detecting and correcting upsets in the configuration memory and mitigating their effects on the implemented functionality.

Description of the Prior Art

FPGAs are integrated circuits that may be programmed to perform specific logic functions, as disclosed in "Virtex UltraScale FPGAs Data Sheet: DC and AC Switching Characteristics", Xilinx Inc. DS893 (v1.7.1) Apr. 4, 2016 and "Stratix 10 Device Overview S10-OVERVIEW", Altera Corp. 2015 Dec. 4.

These integrated circuits typically consist of an array of programmable resources. These programmable resources can include dedicated input and output blocks (IOBs) and configurable logic blocks (CLBs), random access memory blocks (BRAMs), micro-processors, clock managers, delay locked loops and so forth.

Each programmable resource typically includes both programmable interconnect and programmable logic. The programmable interconnect typically includes a large number of lines, of various lengths, which can be short-circuited or isolated by the so called programmable interconnect points (PIPs).

FPGAs are widely adopted in a variety of applications from consumer electronics, such as Smart TVs, to niche applications, such as avionics and electronics for space, for implementing fast logic due to their re-configurability, large real-time processing capabilities and embedded high-speed serial IOs.

However, these devices are sensitive to radiation effects such as single event upsets (SEUs) or multiple bit upsets (MBUs) in the configuration memory, which may alter the implemented functionality as disclosed in M. Wirthlin, "High-Reliability FPGA-Based Systems: Space, High-Energy Physics, and Beyond", in Proc. of the IEEE, vol. 103, no. 3, pp. 379-389, March 2015. doi: 10.1109/JPROC.2015.2404212 and H. Quinn, "Radiation effects in reconfigurable FPGAs. Semicond. Sci. Technol., vol. 32, no. 4 (8 pp), March 2017 doi: https://doi.org/10.1088/1361-6641/aa57f6.

Therefore, these effects must be properly mitigated in order to guarantee a reliable operation of the device.

Special families of FPGAs (e.g., the Xilinx® Virtex-5QV, as disclosed in "Radiation-Hardened, Space-Grade Virtex-5QV Family Overview" Xilinx Inc. DS192 (v1.4) Nov. 12, 2014) have been designed for space applications, but their high cost (few 10 k$), with respect to their standard counterpart (~500$), usually limits their usage in other applications, including the control of particle accelerators, medical applications or electronics for Nuclear and Sub-Nuclear Physics experiments.

Therefore, there is a strong interest in finding solutions for enabling the usage of standard FPGAs also in such applications.

Methods based on triple modular redundancy, as disclosed in L. Sterpone and M. Violante, "Analysis of The Robustness of The TMR Architecture in SRAM-based FPGAs", IEEE Trans. on Nucl. Sci., vol. 52, no. 5, pp. 1545-1549, October 2005. doi: 10.1109/TNS.2005.856543, and periodic correction of the configuration, i.e., configuration scrubbing, as disclosed in I. Herrera-Alzu and M. Lopez-Vallejo, "Design Techniques for Xilinx® Virtex FPGA Configuration Memory Scrubbers", IEEE Trans. Nucl. Sci., vol. 60, no. 1, pp. 376385, February 2013., in A. Stoddard, A. Gruwell, P. Zabriskie and M. J. Wirthlin, "A Hybrid Approach to FPGA Configuration Scrubbing", IEEE Trans. on Nucl. Sci., vol. 64, no. 1, pp. 497-503, January 2017. doi: 10.1109/TNS.2016.2636666, and in M. Berg, C. Poivey, D. Petrick, D. Espinosa, A. Lesea, K. A. LaBel, M. Friendlich, H. Kim, A. Phan, "Effectiveness of Internal Versus External SEU Scrubbing Mitigation Strategies in a Xilinx FPGA: Design, Test, and Analysis", IEEE Trans. Nucl. Sci., vol. 55, no. 4, pp. 2259-2266, August 2008 doi: 10.1109/TNS.2008.2001422, are used in order to correct SBUs and MBUs, which become more significant as the technological scaling proceeds towards smaller feature sizes.

The reason for coupling scrubbing to modular redundancy is that fault masking techniques require to avoid the accumulation of errors in the FPGA, as disclosed in A. Manuzzato, S. Gerardin, A. Paccagnella, L. Sterpone, M. Violante, "Effectiveness of TMR-Based Techniques to Mitigate Alpha-Induced SEU Accumulation in Commercial SRAM-Based FPGAs", IEEE Trans. Nucl. Sci., vol. 55, no. 4, pp. 1968-1973, August 2008 doi: 10.1109/TNS.2008.2000850 and in P. S. Ostler, M. P. Caffrey, D. S. Gibelyou, P. S. Graham, K. S. Morgan, B. H. Pratt, H. M. Quinn, and M. J. Wirthlin, "SRAM FPGA reliability analysis for harsh radiation environments", IEEE Trans. Nucl. Sci., vol. 56, no. 6, pp. 3519-3526, December 2009.

Some FPGAs include a dedicated self-correction circuitry for configuration error detection and correction (EDAC) based on extra parity bits added to the actual configuration data.

These circuitries normally are limited by the amount of parity bits in the maximum number of errors they can detect and correct.

In latest generation devices, the correction circuitry can detect double bit errors and correct single bit errors detection (SECDED) at each configuration memory location, which normally includes thousands of bits.

Other scrubbing architectures, such as disclosed in Xilinx Inc., "LogiCORE IP Soft Error Mitigation Controller", v4.0, 2013, can correct an arbitrary number of errors since they are based on external radiation-hardened memories which preserve a golden copy of the FPGA configuration. Being external components, these memories add up to the overall system complexity, cost and power consumption.

Scrubbing techniques based on configuration redundancy have been developed in order to avoid external memories and correct MBUs at the same time.

Although it cannot be classified as a scrubber, the solution disclosed in G. C. Steiner, "Method And Apparatus For Error Mitigation Of Programmable Logic Devices Configuration Memory", U.S. Pat. No. 7,298,168B1, Nov. 20, 2007, shows an FPGA architecture and a design implementation flow aimed at generating redundant configuration at the bit level.

Identical configuration bits are grouped into voting groups and the outputs from the voters determine the actual behaviour of the logic in the fabric. Since it requires a dedicated FPGA architecture, this approach can be pursued only by vendors fabricating devices and it cannot be implemented at the user level. Moreover, it does not allow to detect upsets, but only to mask them, therefore it is not effective against the accumulation of upsets and it does not allow to log them.

The solution described in P. H. Alfke, "System for preventing radiation failures in programmable logic devices", U.S. Pat. No. 6,104,211A, Aug. 15, 2000 and the work presented in I. Herrera-Alzu and M. Lopez-Vallejo, "Self-reference scrubber for TMR systems based on xilinx virtex FPGAs", Lecture Notes Comput. Sci., vol. 6951, pp. 133-142, 2011, LNCS. are both based on configuration redundancy at the device level. Three identical FPGAs implement the same design and therefore host the same configuration. The main limitations of this approach are the need for three devices, the increase of the power consumption by a factor three and the need for an additional device or resources to perform scrubbing and majority voting of the outputs.

Another approach based on configuration redundancy at the frame level is disclosed in J. Tonfat, F. L. Kastensmidt, P. Rech, R. Reis, and H. M. Quinn, "Analyzing the Effectiveness of a Frame-Level Redundancy Scrubbing Technique for SRAM-based FPGAs", IEEE Trans. Nucl. Sci., vol. 62, no. 6, pp. 3080-3087, December 2015, for a Xilinx® Virtex-5 FPGA. The technique requires a custom design flow, which is based on a legacy tool (Xilinx® ISE), its ability to export layouts in the Xilinx® Design Language (XDL) format, and the Rapidsmith academic CAD tool as disclosed in C. Lavin, M. Padilla, J. Lamprecht, P. Lundrigan, B. Nelson, and B. Hutchings, "RapidSmith: Do-it-yourself CAD tools for xilinx FPGAs", in Proc. 2011 21st Int. Conf. F. Program. Log. Appl., September 2011, pp. 349-355. The Rapidsmith tool is used for replicating the layout of a module three times and therefore generating three identical subsets of the configuration, therefore the Authors exploit modular redundancy to generate configuration redundancy.

The disclosed solution requires to find three identical subsets of the FPGA device for hosting the three identical layouts, which may not be possible for designs occupying a higher percentage of the device resources.

In this implementation the scrubbing logic and a voter for the three modules are implemented in the fabric. This solution leads to a power consumption increase related to the additional programmable resources used. However, as disclosed in R. Giordano, A. Aloisio, V. Bocci, M. Capodiferro, V. Izzo, L. Sterpone, M. Violante, "Layout and Radiation Tolerance Issues in High-Speed Links", IEEE Trans. Nucl. Sci. vol. 62, no. 6, pp. 3177-3185, December 2015. doi: 10.1109/TNS.2015.2498307 the impact on power consumption is milder with respect to solutions based on redundant devices, where also the device quiescent power is triple.

Unfortunately, newer FPGA families, such as the 7-Series, the Ultrascale or the Ultrascale+, are not supported by the Rapidsmith tool, and latest generation FPGAs are not supported by ISE either. In addition to that, the new Xilinx® CAD tool Vivado, recommended for designs based on 7-Series onwards, does not support the XDL. New initiatives, such as disclosed in "RAPIDSMITH 2: A Library for Low-level Manipulation of Vivado Designs at the Cell/BEL Level", B. Nelson, T. Haroldsen, T. Townsend, [Online] Available: https://github.com/byuccl/RapidSmith2/blob/master/doc/TechReport.pdf, have been launched for enabling custom design flows also with the Vivado tool.

However, the usage of third party layout tools adds up to the complexity of the design flow and it usually does not allow the designer to choose the latest generation devices, since dedicated support must be implemented for each new FPGA family.

SUMMARY OF THE INVENTION

The present invention aims at solving these and other problems by providing a method and an apparatus for generating redundant configuration in FPGA devices.

The basic idea of the present invention is to generate redundant configurations.

In particular, the method is based on the combination of the verification of the copy of configuration frames, of the measurement of the power absorbed by the device, and of the testing of the functionality during the copy of each configuration frame or of a set of frames. The generated redundant configuration can be used by dedicated circuits in order to detect and correct configuration upsets by means of majority voting.

This objective is achieved by means of a method for generating redundant configuration in FPGA device, comprising the steps of:
 analysing the configuration corresponding to a given design to be configured, or already configured, in the FPGA device, in order to identify programmed and empty configuration memory portions,
 configuring the FPGA device for implementing said design,
 measuring the power consumption of the configured FPGA device,
 copying the configuration from at least some subsets of the programmed portion to subsets of the empty portion,
 (a) verifying the configuration read back from said subsets of the empty portion with the configuration data read from said subsets of the programmed portion,
 (b) verifying whether the functionality of the design after the copy is still correct,
 (c) measuring the power consumption of the FPGA device, and verifying whether the power consumption variation of the FPGA device after the copy is acceptable according to pre-defined criteria,
 if the verification steps (a), (b) and (c) are all successful the redundant configuration is correctly generated, and
 if the verification steps (a), (b) and (c) are not all successful the method restarts from the beginning choosing other subsets of the empty portion of the FPGA device for copying the configuration data from said programmed portion.

BRIEF DESCRIPTION OF DRAWING

The characteristics and other advantages of the present invention will become apparent from the description of an embodiment illustrated in the appended drawings, provided purely by way of no limiting example, in which:

FIG. 3A shows a successful frame copy and FIG. 3B shows a failed frame copy.

4A), during a passed power consumption test (FIG. 4B) and during a failed one (FIG. 4C), FIG. 5A shows the initial configuration implementing correct functionality, before the copy has been performed, FIG. 5B shows a first example of the configuration after the copy of a frame, where bits corresponding to PIPs are altered and generate a short circuit, FIG. 5C shows a second example of the configuration after the copy of a frame, where bits corresponding to a LUT are altered and change its logic function, and FIG. 5D shows a third example of the configuration after the copy of a frame, where bits corresponding to PIPs are altered, but they do not impact the initial, correct functionality.

DETAILED DESCRIPTION OF THE INVENTIONS

In this description, any reference to "an embodiment" will indicate that a particular configuration, structure or feature described in regard to the implementation of the invention is comprised in at least one embodiment. Therefore, the phrase "in an embodiment" and other similar phrases, which may be present in different parts of this description, will not necessarily be all related to the same embodiment. Furthermore, any particular configuration, structure or feature may be combined in one or more embodiments in any way deemed appropriate.

The references below are therefore used only for the sake of simplicity, and do not limit the protection scope or extension of the various embodiments.

All user-programmable features of FPGA devices are controlled by memory cells, which must be configured according to the design to be implemented.

These memory cells are collectively known as configuration memory, as disclosed in "7-Series FPGAs Configuration User Guide", Xilinx Inc., San Jose, Calif. 2016 https://www.xilinx.com/support/documentation/user_guides/ug470_7Series_Config.pdf.

The configuration memory cells define, for example, logic equations for CLBs, signal routing for PIPs, input/output voltage standards for IOBs, and all other aspects of the design. The device configuration memory is logically partitioned in the so-called "frames", which are arranged vertically. The frame is the smallest accessible configuration fragment and in recent devices can include a few thousands of bits as shown in Table 1.

TABLE 1

Frame sizes in recent Xilinx ® FPGA families.

| Family | Virtex-5 | Virtex-6 | 7-Series | Ultra-scale | Ultra-scale+ |
|---|---|---|---|---|---|
| Size (bits) | 1312 | 2592 | 3232 | 3936 | 2976 |

Figure 1:
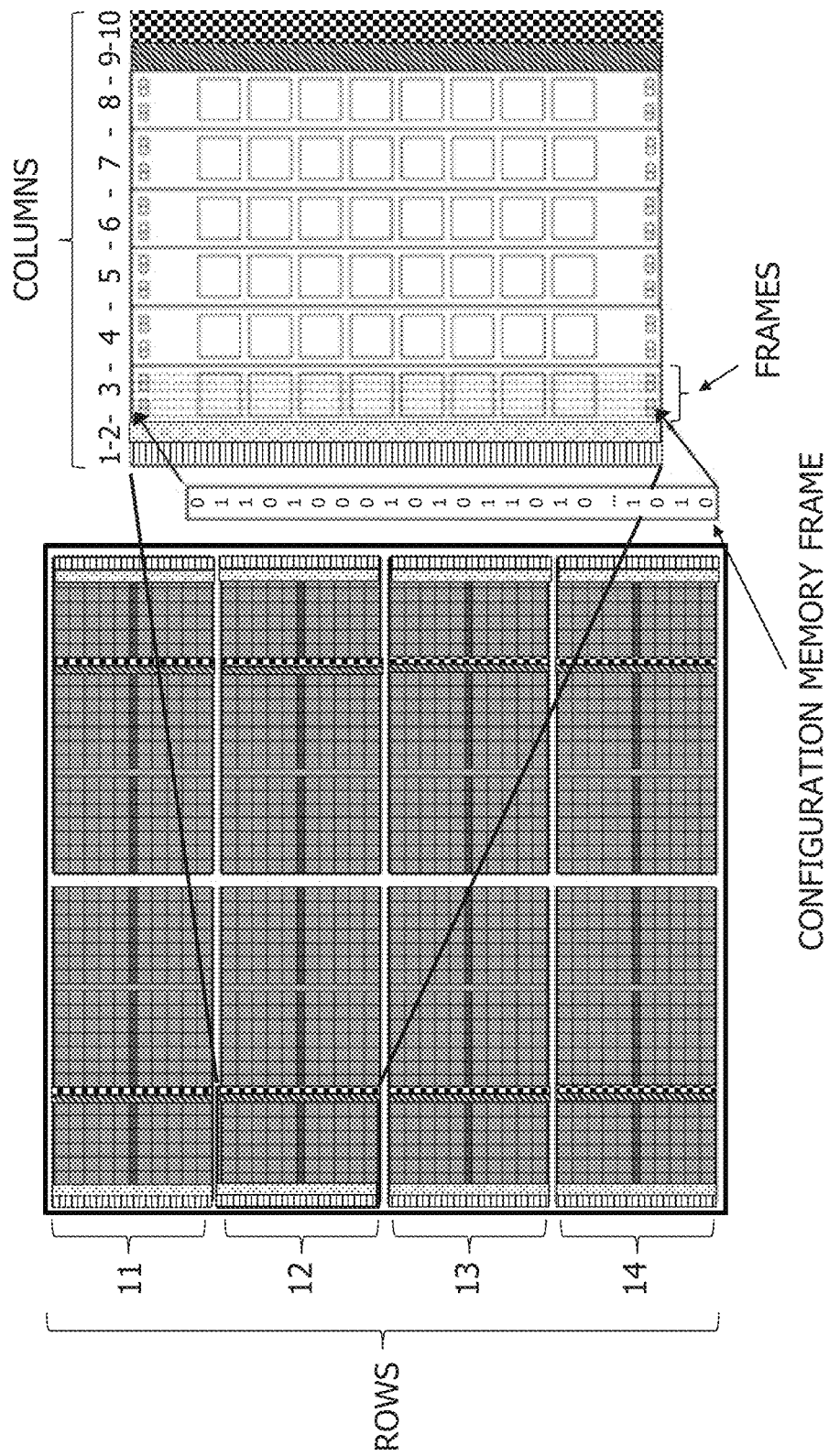
FIG. 1 shows an exemplary embodiment of the layout of programmable resources and configuration frames in an FPGA.

From a configuration perspective, the FPGA structure can be divided into rows and columns (see FIG. 1).

FIG. 1 shows the layout of the programmable resources and configuration frames in an FPGA. A row (e.g., reference number 12) consists of a sequence of columns related to resources such as CLBs, IOB s, BRAMs and so forth. Other rows 11, 13, and 14 are also shown.

In particular, reference number 1 refers to a IOB column, reference number 2 refers to a IO Interconnect column, reference numbers 3 to 8 refer to CLB columns, reference number 9 refers to BRAM column and reference number 10 refers to BRAM Interconnect column.

Each column requires one or more frames to be configured. Unused columns correspond to configuration frames set to a default, predictable value.

It is important to note that the configuration memory is pretty different from standard memories, which are used only to store information. In fact, since each configuration bit controls a physical resource, any change may have an impact on the device behaviour, both logically and electrically. An important consequence of this peculiarity is that it is not possible to store any data in any frame, as it might lead to an incorrect operation of the device.

A typical design flow for FPGAs ends with the generation of a configuration file, the bitstream, to be loaded onto the device in order to implement the design functionality. In order to analyse the configuration content of the design, it is possible to dump the frame content for each frame address from the bitstream file or, after programming the FPGA device, by reading back the configuration from it.

This can be performed by means of a custom software program, referred to as the "analysis script". The same analysis script can also group frames into sequences of empty frames, i.e., frames which are going to be loaded with their default data, and programmed frames, i.e., frames which are going to be loaded with data different from the default.

For a given design, the script determines which frames are programmed and which are not, and it produces a list of programmed and empty sequences. In the following, it is described an example of a list of frame sequences generated by a configuration analysis script.

List of Programmed Frame Sequences
    # e.g. the following line describes a sequence of programmed frames
    # starting at address 0x0000001D ending at address 0x0000009D and
    # consisting of 43 frames (frame addresses do not grow linearly)
    PROGRAMMED 0x0000001D 0x0000009D 00000043
    # e.g. the following line describes a sequence of default value
    # frames starting at address 0x00000100 ending at address 0x00000C9A
    # and consisting of 817 frames
    # (frame addresses do not grow linearly)
    EMPTY 0x00000100 0x00000C9A 00000817
    PROGRAMMED 0x00000C9B 0x00000D23 00000039
    EMPTY 0x00000D80 0x00000C9A 00000344
    PROGRAMMED 0x00001280 0x0000129F 00000032
    EMPTY 0x00020000 0x00C201FE 00006126

Modern FPGAs enable read and write access to configuration frames by means of the so-called Configuration Access Ports referred to as CAPs. In fact, it is possible to write software or hardware controllers, which permit to access individual frames via the CAP of the FPGA.

It is possible to configure the FPGA with the bitstream pertaining to the design and then use the above-mentioned controller to readback the configuration from the device and/or to generate redundant copies of programmed frames into empty frames.

However, care must be taken in this operation as the content of the configuration memory has a physical impact on the device and not any frame is compatible to host the content from any other frame.

Moreover, the type of each frame is normally unknown to the designer since FPGA vendors do not disclose such implementation details. In any case, copying configuration from a frame, or set of frames, to another frame, or set of frames, may lead to misbehaviours of the circuit or to an unintended increase of the power consumption related to driver contentions on the programmable interconnect.

The solution described in this document consists of a method for the generation of redundant configuration which is completely independent of such details of the underlying hardware. The solution is based on a dedicated controller connected to an FPGA and a number of ammeters, one per each FPGA power domain (let N be the number of power domains) and a power supply.

Figure 2:
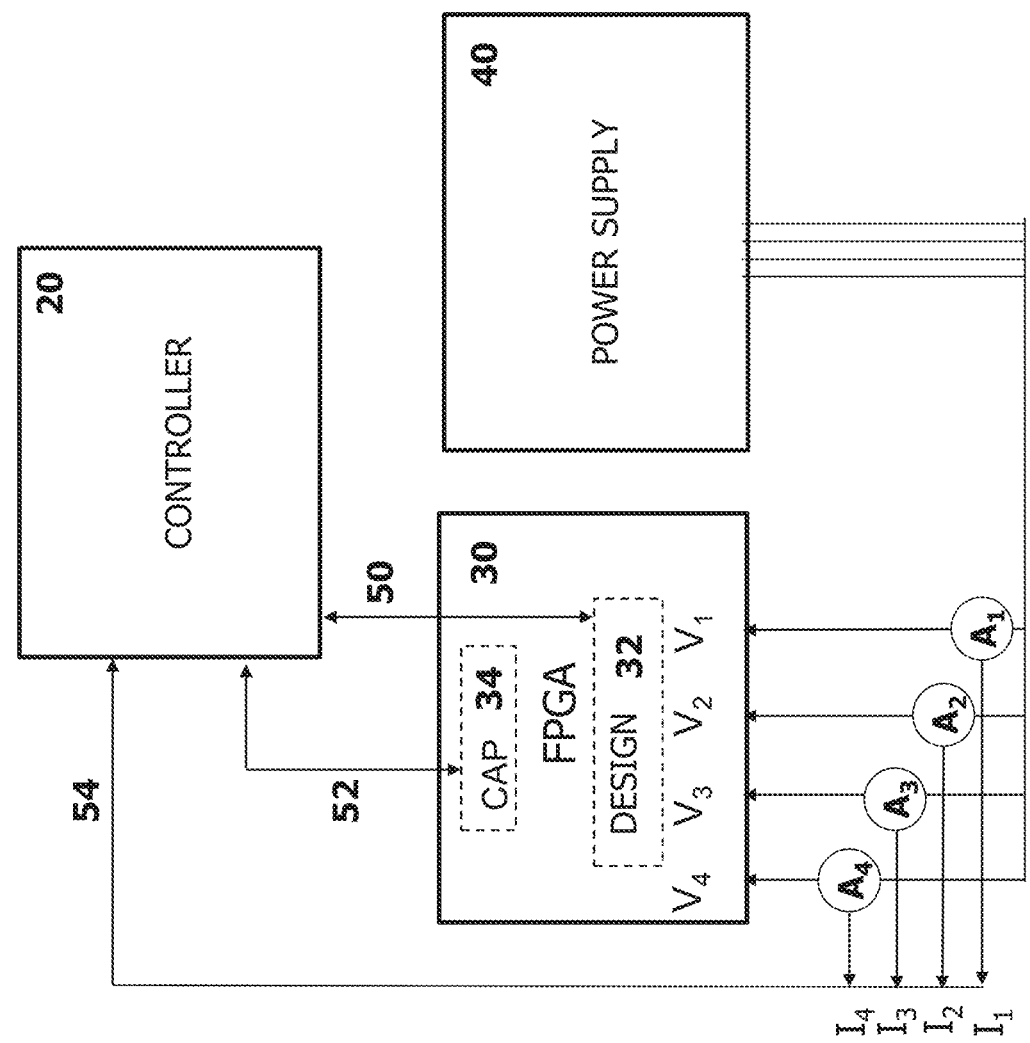
FIG. 2 shows an example of a setup for redundancy generation in a FPGA with four power domains.

FIG. 2 shows an example, where the FPGA 30 has four power domains, each connected to an output channel of the power supply 40, through an ammeter $A_i$ (with i=1, 2, 3, 4).

Each ammeter is a device for measuring the electric current through a wire or a circuit element, and it measures the correspondent currents $I_1$, $I_2$, $I_3$, $I_4$ associated to each power domain.

The power supply 40 is a device providing the required supply voltages for proper operation of the FPGA, $V_1$, $V_2$, $V_3$, $V_4$. The number of power domains and the required supply voltage at each domain depend on the specific FPGA device and they are normally specified in its datasheet.

The replication controller 20 exchanges functional input/output signals 50 with the design 32 configured in the FPGA and configuration input/output signals 52 with the Configuration Access Port (CAP) 34 of the device.

All the current measurements $I_1$, $I_2$, $I_3$, $I_4$ are fed back to the dedicated controller 20 by means of signals 54.

For each frame of each sequence of frames identified by the analysis script, the controller 20, by means of the signals 52 accesses the CAP 34 to copy the configuration from a source frame address SRC to a destination frame address DST.

Moreover, after the copy, the controller 20 reads back the configuration data from the CAP 34 by means of the signals 52 and compares them with the data it attempted to write.

If there is a match the copy is successful, otherwise the copy is failed. It might fail, for instance, if the destination frames configure different resources with respect to the source frames.

Figure 3B:
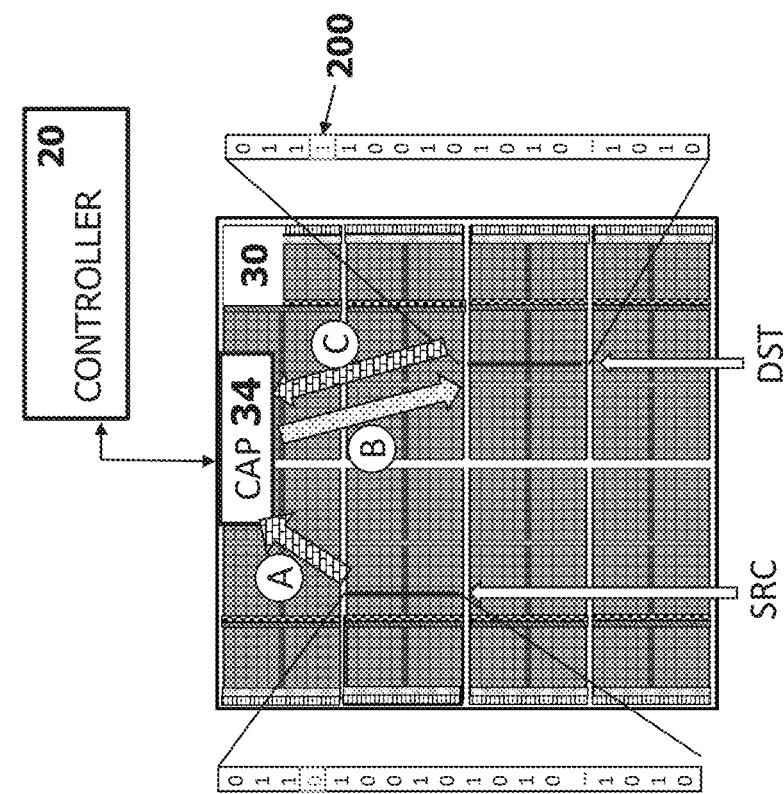
FIGS. 3A and 3B show examples of attempted frame copies; in particular
Figure 3A:
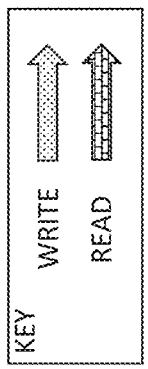
Figure 3A:
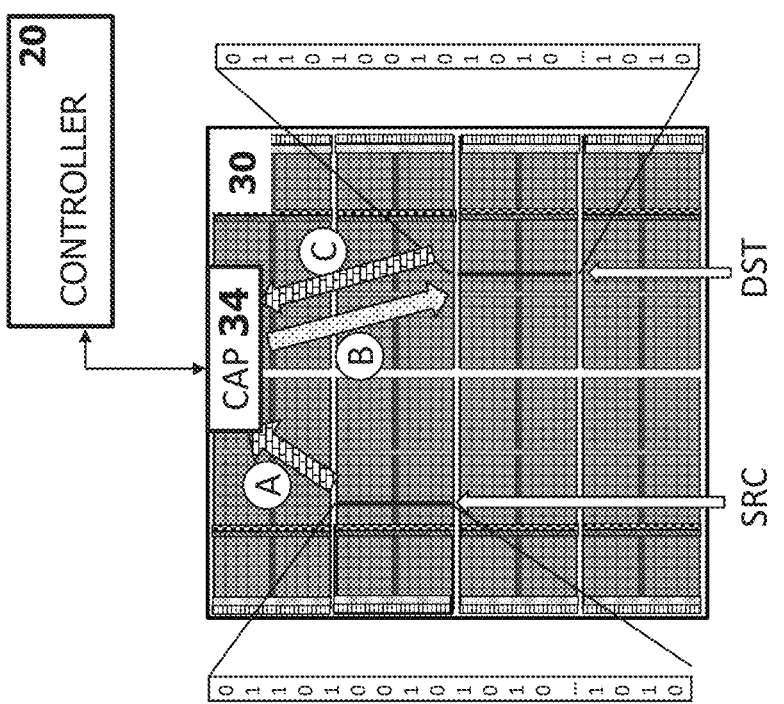

FIGS. 3A and 3B show examples of attempted frame copies. The controller 20 reads (arrow A) the frame data from the SRC address through the CAP 34, writes (arrow B) the same data at the DST address through the CAP 34 and reads the data back (arrow C) from the DST address through the CAP 34 for verification.

FIG. 3A shows a successful frame copy and FIG. 3B shows a failed frame copy, as the read back state ('1') of bit 200 does not match with the written state ('0').

For instance, attempting to copy the configuration from a CLB column frame to a IO Interconnect column frame might be unsuccessful, as the configuration cells are connected to different hardware resources and their state might be different when read back.

For example, a certain bit could be read only at the '1' state, attempting to write a '0' in it might be ineffective. When read back, the bit would still result as a '1'.

When the copy is successful, the controller 20 performs a power consumption test by measuring the current values $I_1$, $I_2$, $I_3$, $I_4$ drawn by the FPGA on its power domains, measured before ($I_i$(SRC), with i=1, . . . , 4) and after the copy ($I'_i$(SRC), with i=1, . . . , 4).

A simple method is to evaluate the drawn current differences and compare them to pre-defined threshold values ($\Delta I^{th}_i$, for i=1, . . . , 4), which can be computed as a function of SRC, i.e., $\Delta I^{th}_i = \Delta I^{th}_i$(SRC).

If $|I_i - I'_i| < \Delta I^{th}_i$(SRC) for i=1, . . . ,4, (1)

the power consumption variation is considered normal, otherwise an internal fault, such as a short circuit, is assumed.

The threshold values can be determined by analysing the power consumption of the device during the initial configuration of the source frame sequence to be copied.

The threshold values are in general a function of the time evolution of the current versus the frame address, $I^0_i = I^0_i(f)$ for i=1, . . . , n, where f varies over the frame addresses of the configured sequence (f=0, . . . , SRC).

For example, it is possible to choose the threshold values as:

$$\Delta I^{th}_i(SRC) = \alpha |I^0_i(SRC+1) - I^0_i(SRC)|,$$

where $\alpha$ is a coefficient suitably chosen by the designer.

Figure 4B:
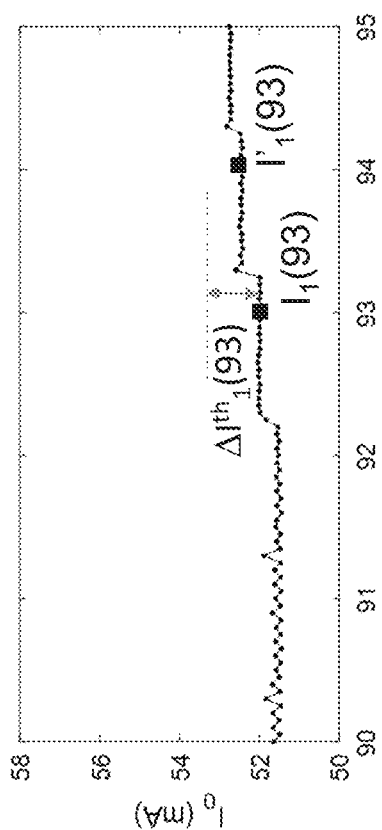
FIGS. 4A, 4B and 4C show examples of the current time evolution as a function of the frame address measured by the first ammeter (A1) during the initial configuration (FIG.
Figure 4C:
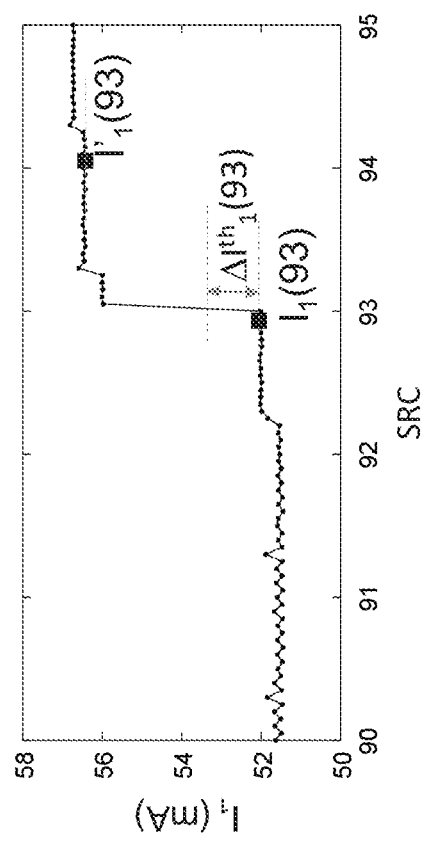
Figure 4A:
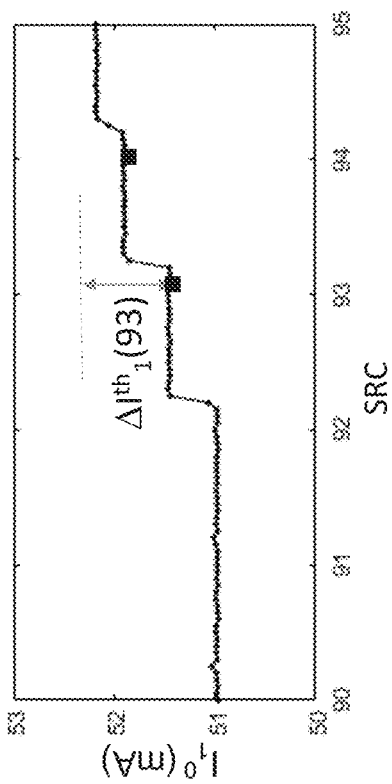

FIG. 4 shows examples of the current time evolution measured by the first ammeter $A_1$ during the initial configuration as a function of the frame address (FIG. 4A), during a passed power consumption test (FIG. 4B) and during a failed one (FIG. 4C). The figures show the value for the SRC 93.

Other more complex methods can be envisaged in order to evaluate whether the power consumption is correct.

For instance, by taking into account the time evolution of the currents as a function of the source frame address at the power domains during the redundancy generation process $I_i(f)$ and the time evolution of the currents $I^0_i(f)$ as a function of the frame address during the initial configuration, and considering them as vectors of the $\ell^2$ sequence space, it is possible to state that the power consumption test is successful if $$\|O(I_i(f), I^0_i(f))\|^2 < K_i \qquad (2)$$

for i=1, . . . , N, where N is the number of power domains, $K_i$ are N real numbers, O is an operator of the $\ell^2 \otimes \ell^2$ space, where the symbol $\otimes$ denotes the tensor product, $\|O(I_i(f), I^0_i(f))\|$ is the norm of the vector $O(I_i(f), I^0_i(f))$ in the $\ell^2 \otimes \ell^2$ space.

The controller 20 also runs a functional test on the design 32 in order to verify if its behaviour is still correct after the copy.

The functional test is performed by comparing the actual output signals 50 of the design 32 with the expected ones, i.e., the correct ones. In other words, the functional test verifies that the redundancy generation process has not corrupted the functionality of 32. This may happen if the new configuration written into the redundant frames interacts with the functionality of the design.

FIGS. 5A, 5B, 5C and 5D show examples of the configuration pertaining to a design 64 and 66 before and after some frame copy attempts.

Figure 5A:
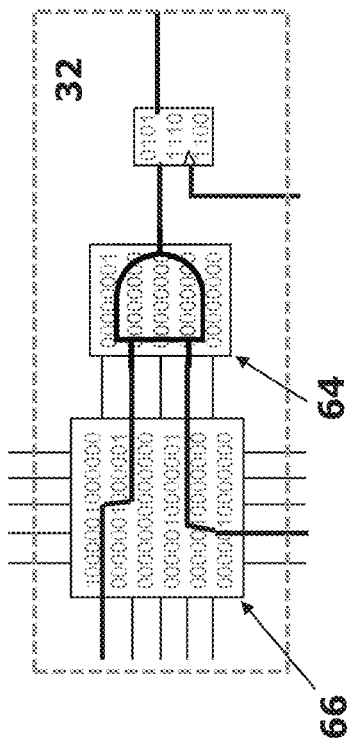
FIGS. 5A, 5B, 5C and 5D show examples of a design configured in the programmable resources of the FPGA.

FIG. 5A shows the initial correct functionality of 32, before the copy has been performed.

Figure 5B:
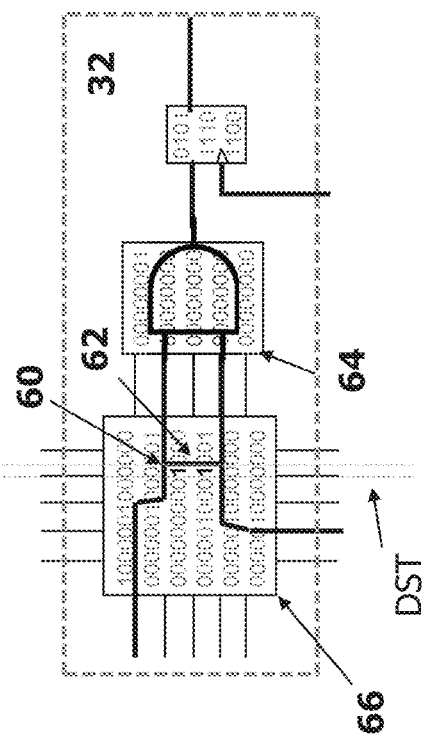

FIG. 5B shows a first example, where the bits 60 altered by the copy corrupt the functionality of 32 by generating a short circuit 62.

Figure 5C:
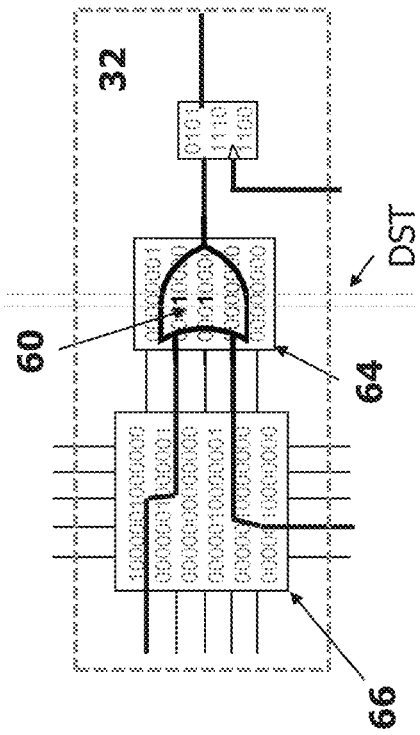

FIG. 5C shows a second example, where the bits 60 altered by the copy corrupt the functionality of 32 by changing the logic function of the look-up-table 64.

Figure 5D:
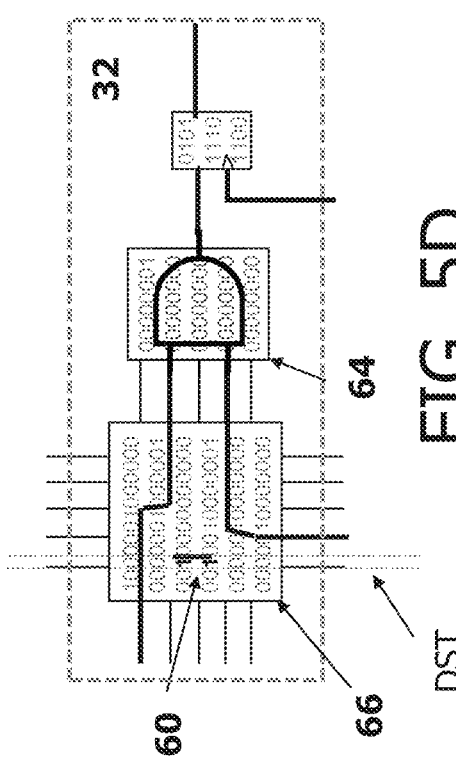

FIG. 5D shows a third example, where the altered bits 60 leave the functionality of 32 unchanged.

In some embodiments, the controller 20 may implement the same functionality of the design 32 and it may provide the correct outputs to be compared against the FPGA outputs 50.

In some other embodiments, the functional test might also be a built-in self-test, i.e., a mechanism that permits the design 32 to check its own functionality and output a passed/failed signal, among signals 50, to the controller 20.

If the copy fails, if the power consumption is not correct with respect to the predefined criteria, or if the functional test is unsuccessful, the controller 20 restarts by restoring the previous configuration of the destination frame, the controller 20 updates DST to a different value and the controller 20 retries the copy operation.

Figure 6:
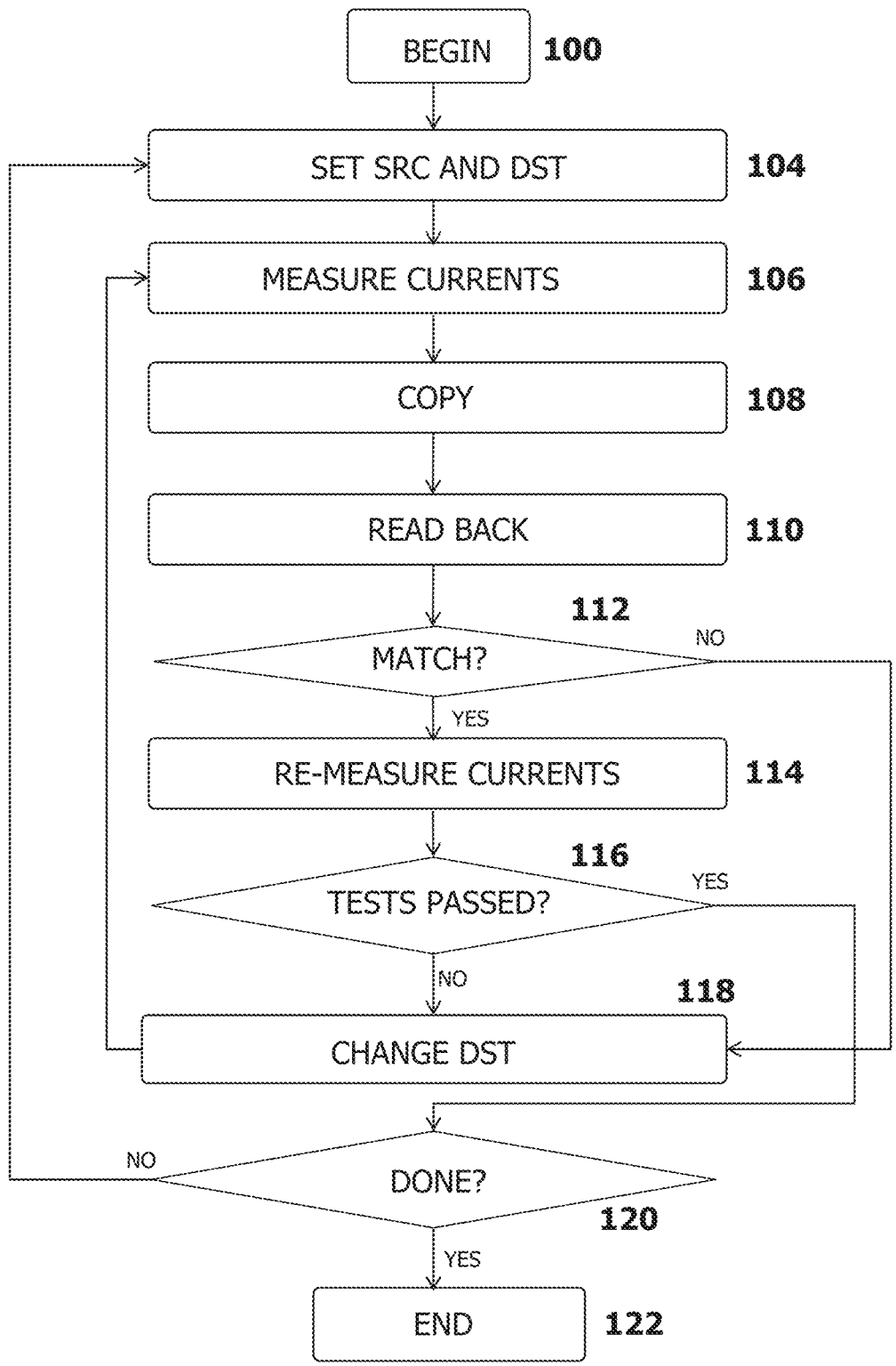
FIG. 6 shows a flow diagram for the generation of a redundant frame sequence.

FIG. 6 is a flow diagram showing the generation steps of a redundant frame sequence.

At step 100, the procedure begins.

At step 104, the source frame address SRC is set to the address of the frame to be copied and the destination frame address DST is set to the address of an empty frame.

In the subsequent step 106, the procedure measures the absorbed current on the FPGA power domains before the copy of the configuration frame $I_i(SRC)$, i=1, . . . , N, wherein N indicates the number of power domains comprised in the considered FPGA.

At step 108, the procedure creates a backup copy of the configuration data at the DST address and then copies the configuration data from the SRC address to the DST address.

In the subsequent step 110, the procedure reads back the configuration data written at the DST address in the previous step.

Then at step 112, the configuration data read back at step 110 is compared with the configuration data written at step 108 to verify whether the copy is correct.

The implementation of this comparison depends on how the controller 20 is implemented.

In the case the controller is implemented as a digital circuit, the comparison is probably implemented as a binary bit-to-bit comparator.

In the case the controller 20 is implemented as a software program running on a microprocessor, the comparison is implemented as a function comparing two input variables containing the configuration data of the frames.

It has to be considered that there is a huge number of possible implementations for this operation, and here two examples have been provided.

In FIG. 6, if the copy is correct, the procedure goes to step 114, otherwise, the procedure continues at step 118.

At step 114, the absorbed currents at the FPGA power domains, i.e., the values $I'_i(SRC)$, i=1, . . . , N, are measured.

Then, at step 116 it is verified whether the "power consumption" test and the "functional" test are passed In positive case the procedure jumps to step 120 and in negative case the procedure goes to step 118.

At step 118, the frame at address DST is restored to its configuration before the copy, the DST address is changed to another empty frame address, for instance to the next frame in the empty frame sequence, and the procedure returns to step 106.

It is possible to choose the new DST address in different ways according to the design requirements. For instance, it is possible to choose the new address as the first which allows to find a contiguous number of empty frames for storing the remaining part of the frame sequence. Moreover, it is possible to avoid selected frame intervals in order to leave free frames for additional logic to be configured in the FPGA after the redundancy generation.

At point 120, it is verified whether all the frames of the sequence have been processed, i.e., whether the last frame of the sequence has been reached.

In the positive case the procedure goes to step 122, to process the next frame sequence, and in the negative case the procedure goes back to step 104.

For each frame sequence, depending on whether or not it is critical for the design operation, a different number of redundant copies can be added, from a minimum of 0 (no redundancy) to a maximum value depending on the free resources in the device and on the required reliability level.

Normally, the total number of replicas, including the original configuration, is an odd value to make it possible to majority vote the bits of the copied frames.

It is important to highlight that copied configuration in general does not generate operating circuits.

Only the original configuration pertains to an actual operating circuit, which receives the necessary inputs (e.g., data, clock, resets) and actually drives the outputs.

In this case, the configuration redundancy generation does not increase the dynamic power consumption of the original design.

It can however increase the quiescent power consumption due to the activation of additional resources in the device.

At the end of the configuration redundancy generation, a list of redundant frame sequences and of frame sequences pertaining to empty FPGA configuration portions is produced by the analysis script.

This information can be used by dedicated scrubbers in order to detect and correct configuration upsets by means of majority voting or comparison to the default value.

It is important to remark that in other embodiments of this invention, the proposed flow diagram can be modified for copying subsets of each frame, for instance the bits in specific ranges (e.g., bits from 0 to 31, bits from 45 to 62, bit 66, bits from 1000 to 1005 and so forth). In this case, the frame read back at step 108 before the copy is used. The bits in the specified subsets are set at the value they have at the SRC address and the other bits are left unchanged. The so-modified frame is then written to the DST address. In this case, it is possible to use both empty and programmed frames as destination frames for storing the redundant configuration, provided that at least the bits to be overwritten are unused by the design 32.

It is important to remark that in other embodiments of this invention, the same flow diagram of FIG. 6 can be implemented for processing the frame sequence by copying sets of frames rather than single frames. In other words, the frame sequence could be partitioned in sets of frames, rather than in frames. Each set can include a plurality of frames and each set can be copied according the flow shown in FIG. 6, where SRC and DST are now the starting source and destination frame addresses for each set. The sequence can itself be considered as a set of frames, so the flow shown in FIG. 6 could also be applied to the whole sequence at once.

It is important to remark that in other embodiments of the invention, the controller 20 can be implemented in the same FPGA device, by properly configuring part of its programmable resources.

Other embodiments might use the internal CAP offered by most of the modern devices.

Figure 7:
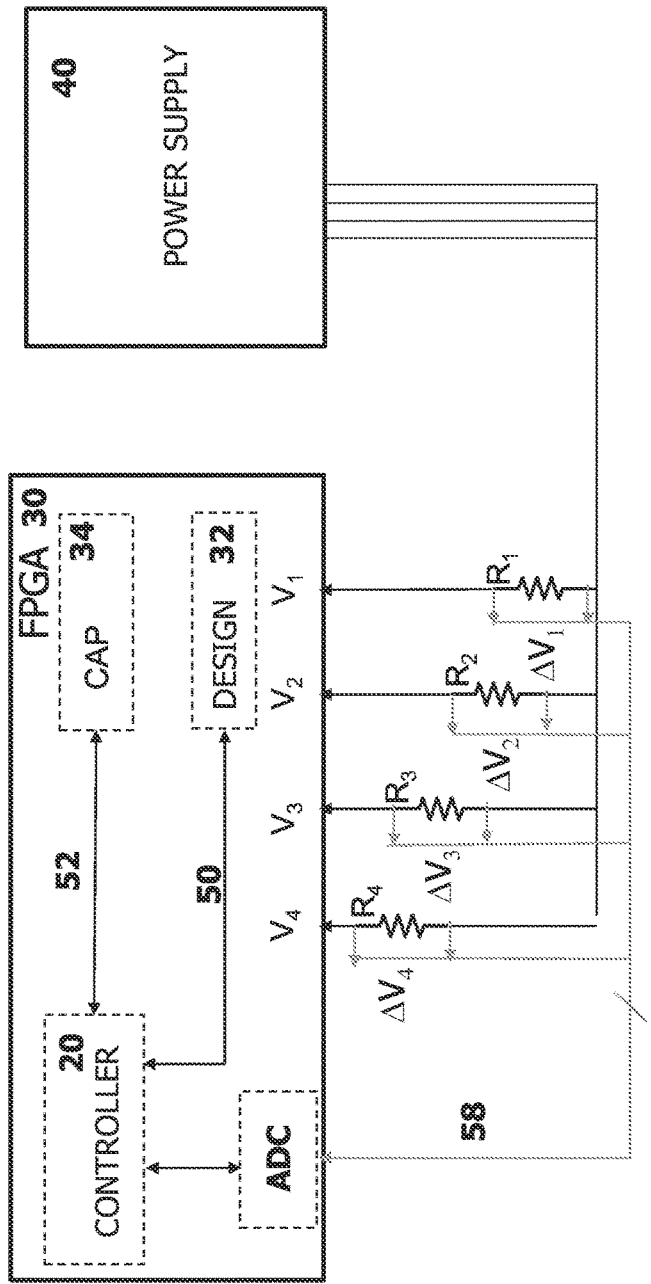
FIG. 7 shows another example of a setup for redundancy generation with an internal replication controller in a FPGA with four power domains.

Further other embodiments, might exploit analog-to-digital converters (ADCs) embedded in the FPGA for monitoring external voltages (see for example FIG. 7).

When coupled to the external shunt resistors $R_1$, $R_2$, $R_3$, $R_4$, an internal ADC module can be profitably exploited to monitor the voltage drop on the resistors ($\Delta V_1$, $\Delta V_2$, $\Delta V_3$, $\Delta V_4$) through signals 58.

Since the resistances of $R_1$, $R_2$, $R_3$, $R_4$ are known, the controller 20 can determine the currents drawn by the FPGA power domains $I_1$, $I_2$, $I_3$, $I_4$ by means of Ohm's law.

It is important to remark that, in the disclosed solution, logic and configuration redundancies are completely decoupled.

Techniques such as Triple Modular Redundancy (TMR) can be adopted for enhancing logic reliability in parallel to this approach, but they are not necessary for performing configuration scrubbing.

Scrubbing techniques built upon TMR-based Frame-Level Redundancy (TFLR), such as the scientific publication J. Tonfat, F. L. Kastensmidt, P. Rech, R. Reis, and H. M. Quinn, "Analyzing the Effectiveness of a Frame-Level Redundancy Scrubbing Technique for SRAM-based FPGAs", IEEE Trans. Nucl. Sci., vol. 62, no. 6, pp. 3080-3087, December 2015, offer benefits related to logic redundancy, but this TFLR solution requires to find three identical subsets of the FPGA device for hosting the same layout three times. Such a requirement might not be met by designs occupying a higher percentage of the device resources.

Moreover, this TFLR solution introduce an additional power consumption due to the operation of the replicas.

It has to be highlighted that the total current $I_t$ drawn by a configured FPGA can be split in two contributions:

1. the quiescent current related to the device itself and referred as $I_q$, which does not depend on the used resources; and 2. the current related to the used logic resources referred as $I_r$ such that $I_t = I_q + I_r$.

Table 2 shows the average current drawn at the core power domain (power supply at 1.0V) by a Xilinx® 7K70T FPGA when configured with a benchmark design.

The measured current at power up is $I_q$, after configuration with the initial bitstream of the benchmark design is $I_c$, and after replication of the frames, performed by means of the method disclosed in this description, is $I_f$.

The currents related to the resources configured by the initial bitstream and to the replicated design, are therefore $I_{r(c,f)} = I_{(c,f)} - I_q$.

The relative increment in power consumption for triplicating the design frames is $$60\% \left( \frac{Irf - Irc}{Irc} \right).$$

TABLE 2

Average current drawn by a Xilinx ® 7K70T FPGA at the core power domain.

| $I_q$ (mA) | $I_c$ (mA) | $I_f$ (mA) | $I_{rc}$ (mA) | $I_{rf}$ (mA) |
|---|---|---|---|---|
| 57 | 80 | 94 | 23 | 37 |

For a TFLR approach, neglecting the voting logic and assuming each of the replicas exhibits the same power consumption of the others, the power would grow by $$200\% \left( \frac{3Irc - Irc}{Irc} \right).$$

Since the proposed technique does not require the redundant frames to be associated to operating logic, the power consumption penalty is significantly lower.

The solution proposed in this document advances the prior art in multiple ways.

It describes a novel redundancy generation technique aimed for scrubbing the configuration of FPGAs.

It leads to a negligible additional power consumption with respect to the prior art. In fact, for selected benchmark designs the power consumption penalty related to the generation of redundant frames can be as low as 60%, while it can reach 200% for TFLR techniques.

The described technique does not require to generate redundant layouts and therefore does not require to find identical subsets of the FPGA device for hosting them. The technique is therefore applicable to a greater deal of designs, with respect to the TFLR of the prior art.

The proposed solution allows the designer to avoid the usage of third-party layout tools and to simplify the design flow, which is not possible with TFLR of the prior art.

In the proposed approach configuration redundancy and modular redundancy are completely decoupled, therefore the power consumption associated to redundant modules is avoided.

The proposed solution is applicable to multiple FPGA devices and families, including latest generation devices, provided they offer an interface for accessing the configuration.

When coupled to dedicated scrubbers, this solution permits to correct single and multiple bit upsets and makes it possible to reduce the increment in power consumption related to the accumulation of configuration upsets.

Moreover, this method is compatible by design with n-modular redundancy (also with n different from 3) and it could be extended for changing the number of redundant copies and the pertaining voting logic at run-time, if needed.

The redundant configuration can be scrubbed during operation by voting the configuration frames as described in R. Giordano et al., "Redundant-Configuration Scrubbing of SRAM-based FPGAs", IEEE Trans. Nucl. Sci. vol. 64, no. 9, September 2017. doi: 10.1109/TNS.2017.2730960.

In fact, the cited document shows how to exploit configuration redundancy to correct single and multiple bit upsets and it makes it possible to reduce the increase in power consumption related to the accumulation of configuration upsets.

The present description has tackled some of the possible variants, but it will be apparent to the man skilled in the art that other embodiments may also be implemented, wherein some elements may be replaced with other technically equivalent elements. The present invention is not therefore limited to the explanatory examples described herein, but may be subject to many modifications, improvements or replacements of equivalent parts and elements without departing from the basic inventive idea, as set out in the following claims.

The invention claimed is:

1. A method for generating a redundant configuration in an FPGA device, the FPGA device being connected to a power supply that provides required supply voltages for proper operation of the FPGA device, the FPGA device comprising a design and a Configuration Access Port (CAP), the method being operated by a replication controller, the method comprising the steps of:

identifying sets of programmed and empty configuration memory frames of the FPGA device pertaining to the design, configuring the FPGA device with configuration data for implementing a functionality of the design, measuring a first power consumption of the configured FPGA device, writing a copy of the configuration data from at least some subsets of the set of programmed frames into at least some subsets of the set of empty frames, (a) verifying whether the copy is correct by comparing the configuration data read back from the at least some subsets of the set of empty frames against the configuration data read from the at least some subsets of the set of programmed frames, (b) running a functional test on the design in order to verify if the functionality of the FPGA device is still correct after the step of writing the copy, (c) measuring a second power consumption of the FPGA device after the step of writing the copy, and verifying whether a variation between the first power consumption and the second power consumption of the FPGA device complies with predefined criteria, and restarting the method from the beginning choosing other subsets of the set of empty frames of the configuration memory of the FPGA device for hosting the configuration data from the at least some subsets of the set of programmed frames if any of the following conditions is met:

the copy, verified at step a), is not correct; or, the functionality of the design, verified at step b), is not correct; or, the variation of the power consumption, verified at step c), does not comply with the predefined criteria.

2. The method according to claim 1, further comprising analyzing the configuration data pertaining to the design to identify each sequence of frames at least in a subset of the set of programed frames, wherein for each frame of each identified sequence of the set of programmed frames, the replication controller, by means of signals, accesses the Configuration Access Port (CAP) to copy the configuration data from a source frame address (SRC) to a destination frame address (DST).

3. The method according to claim 2, wherein the step of identifying comprises identifying each sequence of frames at least in a subset of the set of programmed frames, wherein for each frame of each identified sequence of the set of programmed frames, the replication controller, by means of signals, accesses the Configuration Access Port (CAP) to copy a subset of the frame configuration data from a source frame address (SRC) to a destination frame address (DST).

4. The method according to claim 2, wherein the step of identifying comprises identifying each sequence of frames at least in a subset of the set of programmed frames, wherein for each identified sequence of the set of programmed frames, the replication controller, by means of signals accesses the Configuration Access Port (CAP) to copy a part of the sequence consisting of a plurality of frames starting at a source frame address (SRC) to a homologous plurality of frames starting at a destination frame address (DST).

5. The method according to claim 2, comprising the steps of:

after the step of writing the copy, reading back by means of the replication controller the configuration data from the Configuration Access Port (CAP), and comparing the configuration data with the configuration data read back by the replication controller, and verifying if the configuration data matches with the configuration data read back by the replication controller, in positive case the verification step (a) is successful, otherwise the verification step (a) is not successful.

6. The method according to claim 2, wherein the verification step (b) is performed by comparing the actual output signals of the design with the expected ones, and verifying that the redundancy generation process has not corrupted the functionality of the design.

7. The method according to claim 2, wherein the verification step (b) is performed by means of a built-in self-test, a mechanism that permits to the design to check its own functionality and output a passed/failed signal to the replication controller.

8. The method according to claim 1, comprising the steps of:

measuring the currents drawn by the FPGA device on its power domains, before the step of writing the copy ($Ii(SRC)$), and after the step of writing the copy ($I'i(SRC)$), where $i=1,\ldots,N$ and N is the number of power domains of the FPGA device, evaluating the drawn current differences $|Ii(SRC)-I'i(SRC)|$, and comparing the drawn current differences to pre-defined threshold values ($\Delta Ithi(SRC)$)

wherein, the verification step (c) is successful if $$|Ii(SRC)-I'i(SRC)|<\Delta Ithi(SRC) \qquad (1)$$

for $i=1,\ldots,N$.

9. The method according to claim 8, wherein said pre-defined threshold values ($\Delta Ithi(SRC)$) are computed for each frame at least in a subset of the set of programmed frames to be copied in the step of writing the copy as a function of a pertaining source frame address (SRC).

10. The method according to claim 9, comprising:

taking into account time evolution of the currents at the power domains after the step of writing the copy as a function of the source frame address ($Ii(f)$) and the time evolution of the currents during the initial configuration as a function of the frame address ($I0i(f)$) of the design where $f=0,\ldots,SRC$ varies over all the copied frame source addresses, considering the time evolution of the currents as vectors of a 12 sequence space, wherein, the verification step (c) is successful if $$\|O(Ii(f),I0i(f))\|2<Ki \qquad (2)$$

for $i=1,\ldots,N$, where N is the number of power domains comprised in the considered FPGA, Ki are N real numbers, O is an operator of the $12\otimes12$ space, the symbol $\otimes$ denotes the tensor product, $\|O(Ii(f), I0i(f))\|$ is the norm of the vector $O(Ii(f), I0i(f))$ in the $12\otimes12$ space.

11. The method according to claim 1, wherein the method further comprises the steps of:

setting a source frame address (SRC) equal to an address of a programmed frame to be copied and a destination frame address (DST) equal to the address of an empty frame, measuring an absorbed current on FPGA power domains before a next step of writing the copy of the configuration data $Ii(SRC)$, where $i=1,\ldots,N$, and N indicates the number of power domains comprised in the considered FPGA device, creating a backup copy of the configuration data at the destination address (DST) and then writing a copy of configuration data from the source address (SRC) to the destination address (DST), reading back the configuration data written in the previous step at the destination address (DST), comparing the configuration data read back at the previous step with the configuration data written at the step of writing the copy to verify whether the copy is correct, if the copy is correct, the absorbed currents at the FPGA power domains, are measured, otherwise the destination address (DST) is changed to another empty frame address, verifying whether the verification steps (b) and (c) are successful:

in negative case the frame at the destination address (DST) is restored to its configuration backed up before the step of writing the copy, the destination address (DST) is changed to another empty frame address and the method returns to the measuring step, in positive case it is verified whether all the frames of the sequence have been processed, and in positive case the method goes to the next frame sequence, and in negative case the method goes back to processing the next frame in the sequence of frames.

12. The method according to claim 1, wherein a generation of redundant configuration data can be performed during an operation of the design in order to dynamically change a number of redundant copies of each identified sequence of the subsets of the set of programmed frames.

13. A system comprising:

an FPGA device connected to a power supply that provides required supply voltages for proper operation of the FPGA device, wherein the FPGA device comprises:

a replication controller, a design, a Configuration Access Port (CAP), and a sub-system for measuring a current for each FPGA power domain, wherein the replication controller is configured for executing the method according to claim 1.

\* \* \* \* \*